George R. Brolaski
INVENTOR.

Patented June 3, 1952

2,599,045

UNITED STATES PATENT OFFICE 2,599,045

RESISTANCE WELDING PROCESS

George R. Brolaski, San Diego, Calif., assignor to Rohr Aircraft Corporation, Chula Vista, Calif., a corporation of California Application September 12, 1950, Serial No. 184,428

4 Claims. (Cl. 219—4)

1

The invention relates to processes for resistance welding metallic laminations, and while it is particularly adapted for use in conjunction with intermittent spotwelding operations, it may also be used to great advantage where other forms of resistance welding are concerned.

It is an object of this invention to prevent defacement and deformation of the welded workpiece.

A further object is to prevent discoloration of the welded workpiece.

A still further object is to make possible the manufacture of metal products, the strength, finish and accuracy of which are superior to those of products manufactured by existing resistance welding methods.

Other objects are apparent in the description as hereinafter set forth.

It is recognized by those experienced in the art that during resistance welding operations, certain injuries to the workpiece result from the concentration of pressure between the welding electrodes, as well as from the intense heat generated by the welding current.

Due to the pressure imposed upon it by the electrodes, the metal in the workpiece is made thinner at the welded area. Such thinning of the metal is undesirable in that it impairs the strength of the metal, the finish of the workpiece, and (in cases where close tolerances are to be held) renders it impossible to secure accuracy of dimensions. In the case of aircraft parts and accessories, it is imperative that such welded seams and junctures have maximum strength in order to withstand the effects of engine vibration, as well as the various other stresses and strains encountered during operation of the aircraft.

Also due to the concentration of pressure between the electrodes during a welding operation, the workpiece is in many instances dented and marred, thus detracting from the appearance of the finished product. Such defacement is also undesirable where the surface of the workpiece is required to hold a close tolerance. The severity of the denting varies, depending upon the type of metal being welded, the shape and contact area of the electrode tips or rollers, the amount of pressure required to produce a proper weld, etc.

Discoloration of the workpiece is frequently caused by the intense heat generated by the welding current as it passes through the metal from one electrode to the other. Such discoloration is most pronounced in stainless steels but is also often present in the case of aluminum alloys. The appearance of articles manufactured by resistance welding methods is often of prime importance to the trade and purchasing public.

My invention has eliminated the above described impairments with the result that the objects hereinbefore stated have been accomplished.

Essentially, my invention consists in employing a protector between the workpiece and the welding electrode for the purpose of preventing injury to the workpiece. The protector is made of electrically conductive metal, preferably similar to that of the electrode. In cases where the workpiece is to be welded along a straight line, the protector may have the form of a bar or strip having a length substantially equal to that of the line to be welded. The thickness of the protector is in all cases sufficient to prevent its warping under the pressure of the electrodes, and the width preferably somewhat greater than the contact area of the electrode tip or the welding face of the electrode roller, whichever the case may be. The protector is preferably clamped or otherwise attached to the workpiece in order to prevent its shifting during the welding operation. The contacting surface of the protector is shaped and finished to conform with the adjacent surface of the workpiece, i. e. where the workpiece has a contoured surface, the contacting surface of the protector is provided with a matching contour in order to ensure close contact for transmission of welding current and pressure.

While in most operations the protector is used only on the side of the workpiece required to have a smooth finish, two protectors may be employed, one on either side of the workpiece where finish requirements apply to both outer surfaces. In all cases, thinning of the metal is minimized in that lamination of the workpiece which is in contact with the protector, thus if a protector is employed against each of the outer surfaces of the workpiece, the thinning is minimized in both laminations. The width of the protector (being greater than that of the usual electrode contact area) combined with its linear dimension, provides a fuller surface contact area, thus eliminating the injurious tangential contact of the electrode with the workpiece, and reducing the concentration of pressure at the welding center.

Attention is directed to the accompanying drawing which illustrates a preferred form of my invention, similar numerals of designation referring to similar parts throughout the several views, and in which.

Figures 1, 2, 3, 4:
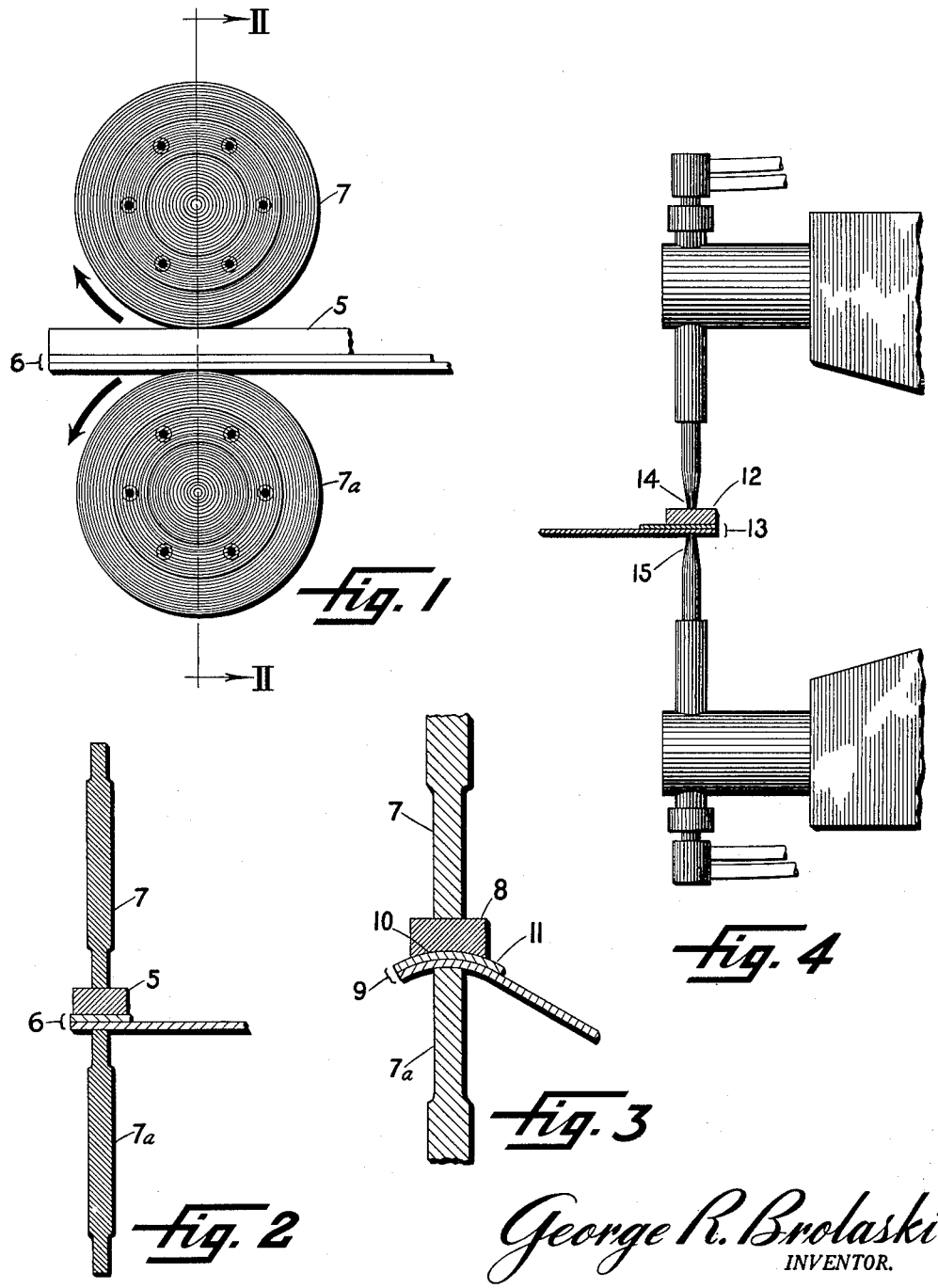
Figure 1 is a view in elevation showing my method being carried out in a typical intermittent spotwelding operation.
Figure 2 is a sectional view of Figure 1, taken along the line designated II—II.
Figure 3 is a sectional view the same as Figure 2, with the exception that the workpiece has a contoured surface.
Figure 4 is a view partially in elevation and partially in section, showing my method being carried out in a typical spotwelding operation.

Referring to Figures 1 and 2 of the drawing, the protector 5 is shown in place between the workpiece 6 and the upper electrode roller 7, the said protector and workpiece positioned as a unit between the said upper electrode roller 7 and the lower electrode roller 7a.

Referring to Figure 3, the protector 8 is shown in place between the workpiece 9 and the upper electrode roller 7, the said protector and workpiece positioned as a unit between the said upper electrode roller 7 and the lower electrode roller 7a. It may be noted that the surface 10 of the said protector 8 conforms with the adjacent portion of surface 11 of the workpiece.

Referring to Figure 4, the protector 12 is shown in place between the workpiece 13 and the upper electrode tip 14, the said protector and workpiece being shifted as a unit between the said upper electrode tip 14 and the lower electrode tip 15 as each spotweld is completed.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

Having thus described my invention, what I claim and desire to secure by Letters Patent is:

1. A welding machine for resistance welding the laminations of a workpiece together comprising, in combination: upper and lower welding electrodes composed of material having a high electrical conductance and spaced apart to receive the workpiece between them; and a long protective strip composed of the same material as the welding electrodes in contact with the top of the workpiece and extending beyond both sides of the upper electrode a distance at least as great as the diameter of the tip of the said electrode, and the thickness of the said strip being greater than the thickness of said workpiece.

2. A welding machine as claimed in claim 1, in which; the said welding electrodes are pivotally mounted rollers adapted for the continuous passage of the workpiece between them and the top and bottom faces of the said protective strips are flat surfaces.

3. A welding machine as claimed in claim 1, in which; the bottom face of the said protective strip is curved to conform to the surface of a curved workpiece interposed between the said welding electrodes, and the top face of the said protective strip is flat adapted to be compressed by an upper electrode having a flat face.

4. A welding machine as claimed in claim 1, in which; said welding electrodes are pivotally mounted rollers, and the bottom face of the said protective strip is curved to conform to the surface of a curved workpiece and the top face of the said protective strip being flat for full engagement by the peripheral surface of the upper roller.

GEORGE R. BROLASKI.

REFERENCES CITED

The following references are of record in the file of this patent:

UNITED STATES PATENTS

| Number | Name | Date |
|---|---|---|
| 1,056,061 | Rogers | Mar. 18, 1913 |
| 1,085,769 | Thomson | Feb. 3, 1914 |
| 1,206,890 | Murray et al. | Dec. 5, 1916 |
| 2,250,617 | Argentin | July 29, 1941 |